United States Patent
Schuerholz

[11] 3,737,689
[45] June 5, 1973

[54] POWER CONDITIONER

[76] Inventor: Donald L. Schuerholz, 5117 Herring Run Drive, Baltimore, Md.

[22] Filed: Aug. 20, 1965

[21] Appl. No.: 481,431

[52] U.S. Cl. ............................ 310/3 R, 321/2, 321/18
[51] Int. Cl. ................................................ G21d 7/00
[58] Field of Search ...................... 310/3; 321/1, 1.5, 321/2, 18, 16

[56] References Cited

UNITED STATES PATENTS

| | | | |
|---|---|---|---|
| 2,849,614 | 8/1958 | Royer et al. | 321/2 X |
| 2,875,351 | 2/1959 | Collins | 321/2 X |
| 2,948,841 | 8/1960 | Locanchi et al. | 321/2 |
| 3,005,942 | 10/1961 | Perdreaux, Jr. et al. | 310/3 X |
| 3,295,043 | 12/1966 | Massey | 321/18 |
| 3,300,705 | 1/1967 | Hunsted | 321/18 X |

Primary Examiner—Benjamin A. Borchelt
Assistant Examiner—G. E. Montone
Attorney—Roland A. Anderson

[57] ABSTRACT

A power conditioner and radioisotope heated thermionic generator, having a self-starting dc-dc converter, and a dependable, electronic shunt regulator for shunting excess power at the beginning of the generator lifetime and zero power at the end of the generator lifetime, and for maintaining a steady, dependable output for a load even if the load current changes from a predetermined level.

7 Claims, 9 Drawing Figures

INVENTOR.
DONALD L. SCHUERHOLZ

2a

2b

2c

2d

INVENTOR.
DONALD L. SCHUERHOLZ

INVENTOR.
DONALD L. SCHUERHOLZ
BY

POWER CONDITIONER

This invention relates generally to systems for nuclear auxiliary power and more particularly to novel method and apparatus for providing power conditioners for radioisotope heated thermionic generators.

In practical radioisotope heated thermionic generator systems, a need exists for power conditioners for converting low voltage outputs to usable load levels. These outputs are very low, e.g. about 1.0 VDC, whereas the load levels are much higher, e.g., 28.0 VDC or higher. Moreover, the radioisotope heat output decreases due to the radionuclide decay of the radioisotope heat source, whereas the load level generally remains constant during the generator design operating lifetime. Also, the efficient trouble-free operation of these systems requires specific low source outputs and high load levels that do not change.

Mechanical devices for power conditioning, do not operate properly at such low output and high load levels. Others, such as those that depend on electrically converting a low voltage direct current to alternating current or pulsating direct current, which is then stepped up in a transformer and rectified to furnish the required high voltage, have been controlled at their output or otherwise with low efficiency or poor reliability, or have been bulky or expensive. It is additionally desirable to provide a DC-DC converter having an automatic starting system that operates at any load level without the aid of auxiliary switches in a practical, radioisotope heated thermionic generator system that is protected from damage from overheating, shorting or unexpected load changes.

It is an object of this invention, therefore, to provide an economical, compact, efficient, reliable, and practical apparatus and method for conditioning the power of a radioisotope heated thermionic generator by providing a shunt regulator coupled to the input of a DC-DC converter;

It is a further object to provide a thermionic generator having a low weight to power ratio;

It is a further object to provide a special switching unit and novel regulating system having thermoelectric coolers to reject excess electrical energy developed by the nuclear generator;

It is a further object to provide a nuclear power system having a high efficiency;

It is a further object to provide an improved light weight, compact, reliable radioisotope heated thermionic power system;

It is a further object to provide a converter-regulator that is automatically self-starting;

It is a further object efficiently to maintain a given operating level in a radioisotope heated thermionic generator.

It is a still further object of this invention to protect a thermionic generator power system from damage due to load changes.

The foregoing objects are achieved by a light weight system having a shunt regulator coupled to the input of a self-starting DC to DC converter for converting a 1.0 VDC output from a radioisotope heated thermionic source to 28.0 VDC and controlling the shunt regulator to shunt current from 0 to 38 amperes whereby the desired load power level and generator voltage are maintained within 1 percent of the desired level at 70 percent efficiency or better. The method and construction involved in this invention utilize well known techniques and apparatus and is highly flexible for a wide range of applications, voltages, power levels, and nuclear heat sources. More particularly, this invention involves the use of a self-starting DC-DC converter and a shunt regulator coupled to the converter input having a threshold transistor acting as a differential amplifier for comparing a sample signal derived from said converter input with a reference signal derived also from said converter input to produce a control signal corresponding to the difference between said converter input voltage and a desired constant level, and a thermoelectric cooled shunting transistor acting as a variable resistor in response to said control signal for maintaining a constant converter output, a constant converter input voltage, and protecting the converter even if the load current changes from a predetermined level. With the proper selection of components and DC-DC converter frequency, as described in more detail hereinafter, the desired electrical levels and efficiencies are achieved.

Various other objects and advantages will appear from the following description of one embodiment of this invention, and the novel features will be particularly pointed out hereinafter in connection with the appended claims.

In the drawings, where like parts are numbered alike:

FIG. 2a is a graphic illustration at a first time of the shunt current required to maintain 1.0 VDC at various full load conditions in the power and VA curves of FIG. 1.

FIG. 2b is a graphic illustration at a second time of the shunt current of FIG. 2a;

FIG. 2c is a graphic illustration at a third time of the shunt current of FIG. 2a;

FIG. 2d is a graphic illustration at a fourth time of the shunt current of FIG. 2a;

It is known that radioisotope fueled thermionic generators utilize the heat of decay of radioisotopes for directly producing electricity. One radioisotope heated thermionic generator is described in U.S. Pat. application Ser. No. 152,506 entitled "Thermionic Energy Converter" filed Nov. 5, 1961 by M.E. Talaat, now U.S. Pat. No. 3,300,661, which utilizes the structure of U.S. Pat. Nos. 2,510,397 and 2,980,819. Suitable loads are conventional telemetry devices and radio transmitters as are well known by those skilled in the art. For practical applications, such as space, deep sea and remote terrestial radio transmission, a power conditioner is required to modify the output of the generator to provide power at desired voltages, currents, waveforms and frequencies. In addition, the power conditioner provides for the desired operating characteristics during load changes as well as to compensate for the decay of the output power of the generator over its useful operating lifetime.

Figure 1:
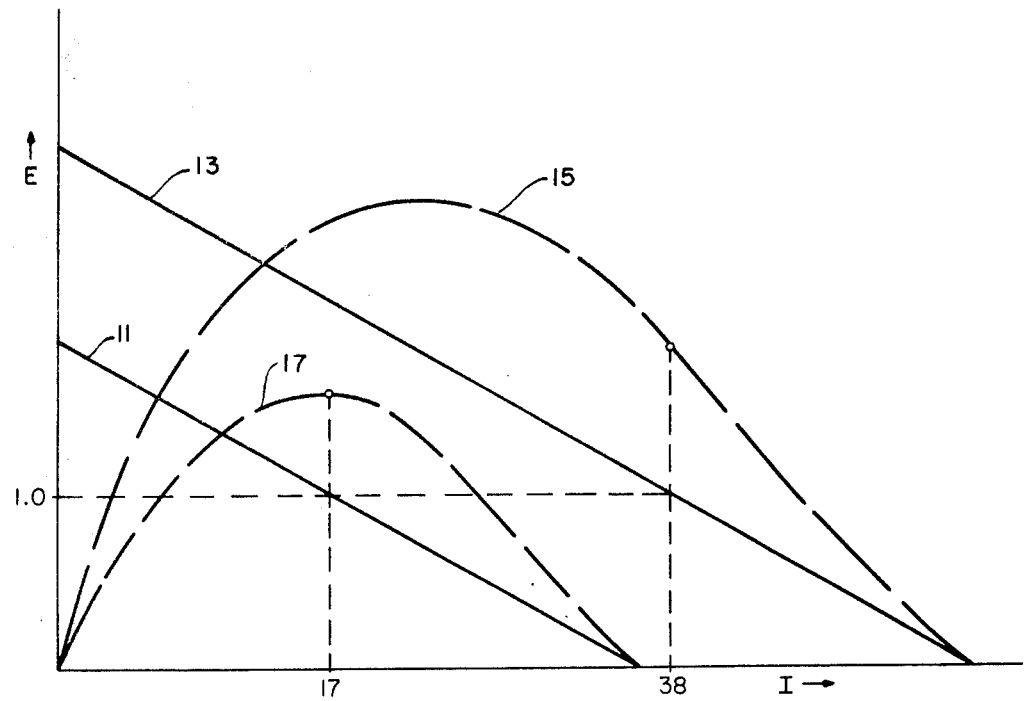
FIG. 1 is a graphic representation of the beginning and end of life power and VA curves of the radioisotope heated generator of this invention.

The characteristics of one typical thermionic generator system fueled with a radioisotope heat source is shown in FIG. 1. It is seen in the example that the peak power out of the generator at the end of its useful operating lifetime occurs at 1.0 VDC and 17 amperes on the end of life VA curve 11 whereas the peak power out of the generator at the beginning of its useful operating lifetime occurs at 1.0 VDC and 38 amperes on the beginning of life VA curve 13. The shunt regulation of this thermionic generator source maintains the load level constant over its useful operating lifetime even though the end of lifetime maximum first operating point is at 38 amperes and over 1.0 VDC on the beginning of life power curve 15 and the beginning of lifetime maximum power second operating point is 17 amperes and between 1.0 VDC and the first operating point on the end of life power curve 17.

Figure 2:
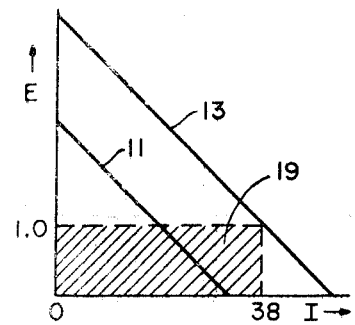
Figure 2:
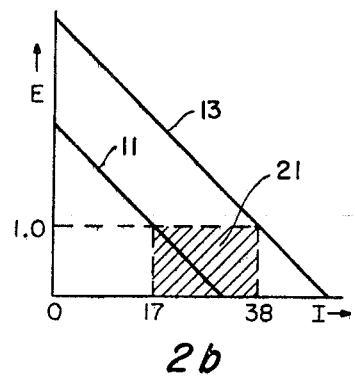
Figure 2:
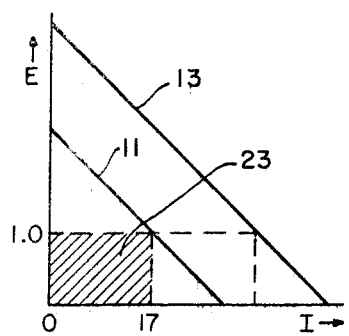
Figure 2:
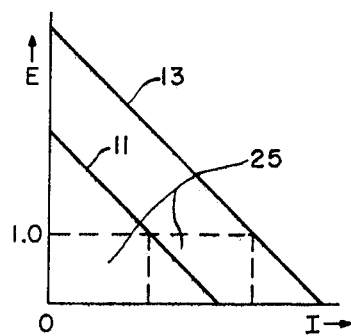

As shown in FIGS. 2a and 2b, the shunt current required to maintain 1.0 VDC at the beginning of life at no load is 38 amperes and at the full load current of 17 amps the shunt current is 21 amps as shown by the cross-hatched areas 19 and 21 derived from the end VA curves 11 and the beginning VA curves 13. On the other hand, the shunt current required to maintain 1.0 VDC at the end of life at no load is 17 amps and at the full load current of 17 amps the shunt current is 0 as indicated by the cross-hatched area 23 and the dashed non cross-hatched area 25 derived from the end VA curves 11 and the beginning VA curves 13 in FIGS. 2c and 2d.

Figure 3:
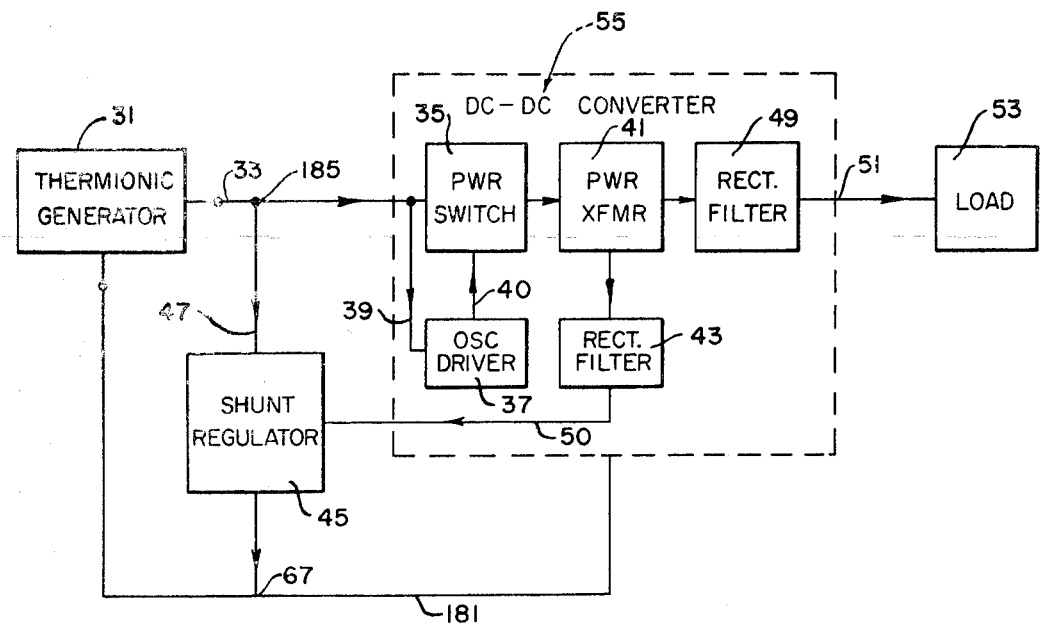
FIG. 3 is a schematic representation of the system of this invention.

Referring to FIG. 3 for an understanding of this invention, radioisotope heated source 31 provides electrical energy corresponding to the radioisotope heat output of the source (not shown). This electrical energy flows through the lead 33 to a series circuit having a power regulator switch 35 including an oscillator driver 37 connected to lead 33 by lead 39 and to switch 35 by lead 40, power regulator transformer 41 including a rectifier filter 43 for energizing shunt regulator 45 that is connected in parallel with switch 35 from source 31 and to the output lead 33 of source 31 by an input lead 47, and a rectifier filter 49 connected through lead 51 in series to load 53. In this system switch 35, oscillator 37, transformer 41, filter 43 and filter 49 comprise DC-DC converter 55.

Figure 4:
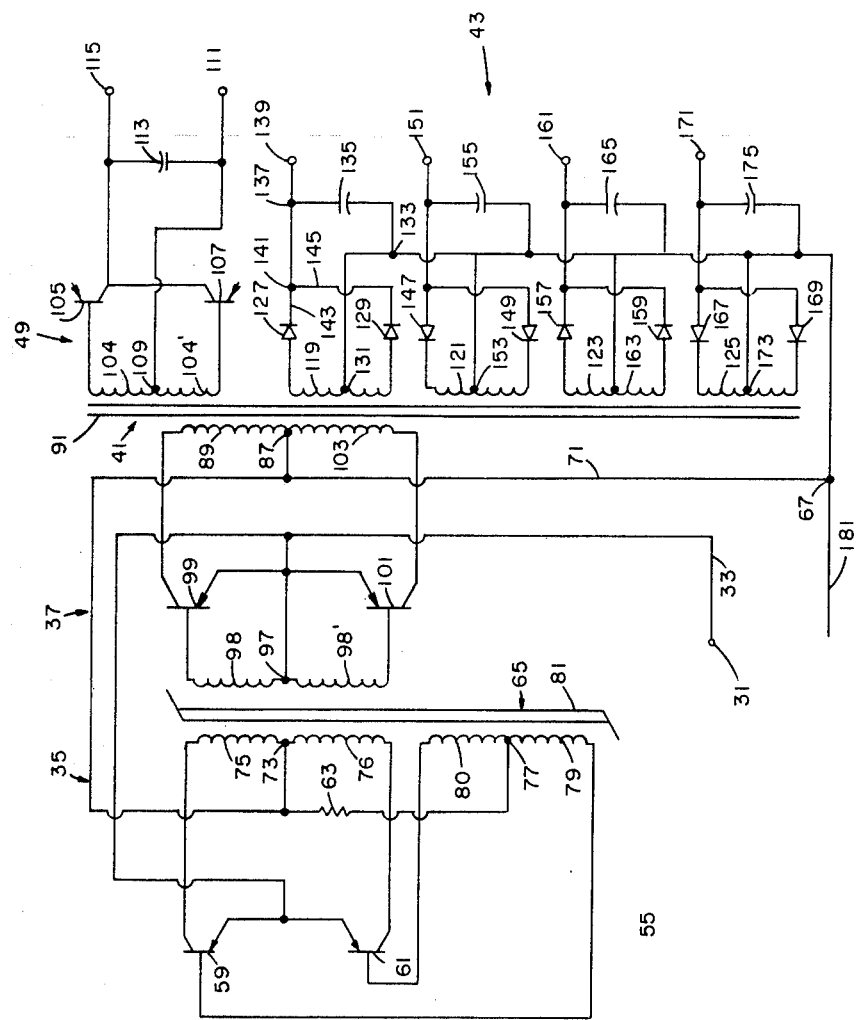
FIG. 4 is a partial schematic diagram of a DC-DC converter for the system of FIG. 3.

Referring to FIG. 4, DC-DC converter 55, comprises a first self-starting power switch 35 having two switching transistors 59 and 61, a start resistor 63 and a transformer 65. A common terminal 67 connects through lead 71 to center tap 73 of first primary winding 75 of transformer 65 and through resistor 63 to center tap 77 of first secondary winding 79 of transformer 65, the transformer 65 having a common core 81. The bases of transistors 59 and 61 connect with each other through the opposite ends of this winding 79 of transformer 65. The source 31 output of +1 VDC provides a separate drive circuit for transistors 59 and 61 and to this end connects through lead 33 directly to the transistor emitters. This system eliminates the need for a separate biasing resistor along with the losses attendant therewith, the power loss in an extra conventional biasing resistor being the square of the average gain of transistors 59 and 61. Also, starting does not depend on leakage current and is initiated automatically at any specified load or environmental condition.

To enable this switch 35 to amplify the +1 VDC signal output from source 31 and apply this amplified signal through transformer 65, oscillator driver 37 is connected between a secondary winding of transformer 65 and a primary winding of power transformer 41. To this end the common terminal 67 is connected to the center tap 87 of primary winding 89 on core 91 of transformer 41 and the +1 VDC input lead 33 from source 31 connects with center tap 97 of secondary winding 98 on core 81 of transformer 65 and directly to the emitters of transistors 99 and 101. The bases of transistors 99 and 101 also connect the opposite ends of secondary winding 98 of transformer 65 and the collectors of transistors 99 and 101 connect the opposite ends of winding 89 of transformer 41. This oscillator 37 transmits the output signal from switch 35 and applies this signal to power transformer 41.

Transformer 41 has a secondary winding 104 whose opposite ends connected with the bases of transistors 105 and 107 in rectifier filter 49. The center tap 109 of this winding 104 has a positive connection 111 and connects with one of capacitor 113. The other end of capacitor 113 has a negative connection 115 and connects with the collectors of transistors 105 and 107. This provides 28 V rectified filtered current across terminals 111 and 115 for energizing load 53 through lead 51.

Secondary windings 119, 121, 123 and 125 of transformer 41 energize rectifier filter 43 for shunt regulator 45. To this end diodes 127 and 129 connect the opposite ends of winding 119, center tap 131 connects with terminal 133, capacitor 135 connects between terminal 133 and terminal 137, terminal 137 connects with +6V terminal 139 and 141 and terminal 141 connects with diode 127 and 129 through leads 143 and 145. Like arrangements are provided for secondary windings 121, 123 and 125 of transformer 41. Thus diodes 147 and 149 connect with −6V terminal 151 and the opposite ends of winding 121 while center tap 153 connects with center tap 131 of winding 119 and capacitor 155, which is also connected to terminal 151. Likewise diodes 157 and 159 connect with +2V terminal 161 and the opposite ends of winding 123 while center tap 163 connects with center tap 153 of winding 121 and capacitor 165, which is also connected to +2 terminal 161. Also, diodes 167 and 169 connect with −3V terminal 171 and the opposite ends of winding 125 while center tap 173 connects with center tap 163 of winding 123, common lead terminal 67 and capacitor 175, which is also connected to terminal 171.

Figure 5:
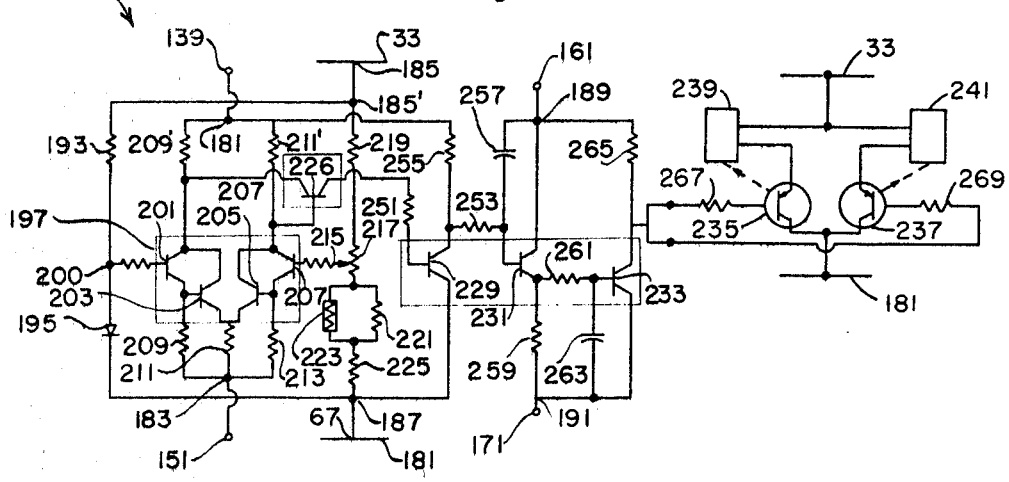
FIG. 5 is a partial schematic drawing of a regulator sensor, comparator and amplifier for the system of FIG. 3.

Referring now to FIG. 5, terminals 139, 151, 161 and 171 provide the bias voltage for regulator 45 for shunting the necessary current from lead 33 to common lead 181. To this end +6V terminal 139 is connected to terminal 181 and −6V terminal 151 is connected to terminal 183 while +1 VDC source 31 is connected in series to terminals 185 and 185′ and common terminal 67 is connected to terminal 187. Also, +2 VDC terminal 161 is connected to terminal 189 and −3V terminal 171 is connected to terminal 191. Additionally, a connection is provided from +1 VDC terminal 185′ through resistor 193 and silicon diode 195 to 187.

Diode 195 establishes a reference voltage for one side of differential sensor amplifier 197, comprising transistors 201, 203, 205 and 207. The base of transistor 201 connects through a resistor to junction 200 between resistor 193 and diode 195 and the emitter and collector of transistor 201 are connected through resistors 209 and 209′ to junctions 183 and 181 respectively. Also, resistor 211 connects the emitters of transistors 203 and 205 to junction 183; resistor 211′ connects to the collector of transistors 205 and 207 to junction 181; resistor 213 connects the emitter and base of transistors 207 and 205 to junction 183, and the collectors of transistors 201 and 203 and 205 and 207 are respectively connected.

The differential amplifier 197 senses a portion of the input voltage from junction 185 through junction 200 and compares it to the reference determined by the setting of wiper 215 on potentiometer 217, which is connected on one end to junction 185 through resistor 219 and on the other end to parallel connected resistor 221 and thermistor 223, which are series connected through resistor 225 to junction 187 and terminal 67. The thermistor 223 is utilized in the sensing side of the differential amplifier 197 to keep the voltage across the amplifier 197 within tolerance for an 0° to 50° C temperature range.

If the input voltage from junction 185 attempts to go above 1.0 VDC a difference voltage $V_D$ is developed by the differential amplifier 197, which is then converted to a proportional current $I_D$ by transistor 226. This current $I_D$ is then amplified in amplifier 227 comprising transistors 229, 231, and 233 and supplied to the base of the shunting transistors 235 and 237. This base current is sufficient to enable transistors 235 and 237 and thermocouples 239 and 241 to shunt a maximum of 38 amperes from lead 33 to lead 181 and thus maintain the voltage in lead 33 at 1.0 VDC.

Suitable resistors and capacitors are used between the components and to this end the collector of transistor 226 connects with the base of transistor 229 through resistor 251, the collector of transistor 229 connects through resistor 253 to the base of transistor 231 and through resistor 255 to junction 181; a capacitor 257 is connected between the base of transistor 231 and junction 189, which is connected to the emitter of transistor 231. The collector of transistor 231 connects through resistor 259 to junction 191 and through resistor 261 to the base of transistor 233 and to capacitor 263, which is connected to the emitter of transistor 233. The collector of transistor 233 connects through resistor 265 to junction 189 and through resistors 267 and 269 to the bases of transistors 235 and 237. The collectors of the latter connect with common lead 181 and the emitters thereof connect through thermocouples 239 and 241 to lead 33.

In order to shunt up to 38 amperes at 1.0 volts, transistors 235 and 237 are protected from thermal runaway and burnout. To this end these transistors are germanium type transistors having thermocouples 239 and 241 that are thermoelectric coolers. The cooler or thermocouple connections described produce cooling by the Peltier phenomenon while providing a power dissipating resistance in series with them. Thus as the shunt current increases through transistors 235 and 237, and thermocouples 239 and 241 from lead 33 to lead 181, the heat produced thereby in transistors 235 and 237 is increasingly absorbed in coolers 239 and 241 and removed thereby from transistors 235 and 237 enabling the increased transistor heat to be absorbed and removed thereby.

Power consuming leakage currents in transistors 235 and 237 are eliminated by feeding back bias voltages from the DC-DC converter 55 to output 51. The load on these bias voltages is inversely proportional to the system load and they therefore aid regulation. At the end of life full load, the bias voltages are unloaded, the regulator 45 is off and there is no power loss or shunting thereby.

The losses of all the described transistors are minimized by selecting germanium transistors with low saturation and high gain. The losses in the described transformers are minimized by using ferrite cores. Suitable transistors are made by Motorola and provided by Honeywell, type MHT 2305 and MHY 2101.

In operation, radioactive source heat causes thermionic generator 31 to produce electrical energy in lead 33 which conducts this energy to switch 35. This switch starts at any load level while oscillator 37 draws electrical energy from lead 33 to drive switch 35 to power transformer 41. The transformer thereupon provides a boosted pulsating DC, which is rectified and filtered before entering load 53. The transformer 41 also drives rectifier filter 43 to drive regulator 45 to shunt the required energy from lead 33 to lead 181 whereby the energy in lead 33 and the energy in lead 51 power the load 53 with the desired constant power. To this end the shunt regulator senses the signal level in lead 33, compares it with a reference derived also from lead 33 to produce a command voltage that is converted to a corresponding command current by transistor 226 and this command current is amplified in amplifier 227 to drive shunt transistors 235 and 237 to shunt the required energy from lead 33 to lead 181 while coolers 239 and 241 protect the shunt transistors 235 and 237 from damage due to changes in load and the like.

It is understood that any desired output voltage can be achieved by adjusting the turns ratio of the converter transformer. Also, by attaching a constant current regulator to the converter output, the system can charge a battery for providing periodic high power output. Additionally, the rectifier circuit can be replaced by a filter to provide AC output.

In an actual example of this invention, the input shunt regulator of this invention operably controlled at one volt the shunting of 0-38 amperes. To this end the switching transistors were high current transistors controlled by a very high open loop gain five-stage amplifier and the beginning of life no load current was actively shunted by a 0-to 10- millivolt increase in the source voltage, the 10-millivolt increase providing a safety factor for input voltage increases due to temperature variations that could result in a lower power requirement for the bias voltage of the first stage.

The first stage comprised the voltage sensor in the described differential amplifier, which compared the source voltage with the reference voltage. The potentiometer 217 provided the desired input voltage. The differential amplifier contained four transistors and the characteristics of the corresponding transistors on each side were properly matched such that parameter variations due to temperature changes tended to cancel out. The transistors were connected so that the base currents of transistors 203 and 205 were the emitter currents of transistors 201 and 207, respectively, thereby giving high sensitivity. Transistors 201 and 207 were high gain, double diffused silicon planar transistors having very low leakage currents ($I_{CO} \cong 10\mu$ A at 150° C) and, therefore, $I_{CO}$ effects on the amplifier were negligible within the temperature tolerances provided from 0-50° C. To operate this stage actively, and have good voltage differencing, negative and positive 6 volt biases were used and associated resistors were chosen such that transistors 203 and 205 had a continuous collector current of 5 milliamperes.

The second stage of amplification contained transistor 229 and current limiting resistors, 251 and 255. This transistor drew no collector current until the threshold of transistor 226 was exceeded, and, therefore, it and the remaining stages did not represent a power loss at end of life.

The third stage contained a silicon PNP transistor 231, current limiting resistors 253 and 259 and capacitor 257 connected to the base emitter terminals of transistor 231. The capacitor lowered the a-c gain of the amplifier to provide close loop stability.

The fourth stage contained a high current silicon NPN transistor 233, resistors 261 and 265 and a capacitor 263 that functioned like capacitor 257. This stage was capable of drawing the base current required to enable the fifth stage to shunt 38 amperes.

The fifth stage contained two parallel connected high current germanium PNP transistors 235 and 237, two Westinghouse WX 816-H type thermoelectric heat dissipators 239 and 241 and two current limiting resistors 267 and 269. These coolers had plates which utilized the Peltier phenomenon to absorb heat and had suitably located holes such that the transistors 235 and 237 were directly mounted in the holes on the plates so that the plates absorbed the heat from the transistors. Transistors 235 and 237 were matched but the resistors could be adjusted if these transistors were not matched.

In the switching section 35 two solid state elements 59 and 61 alternately switched the input power to the primary 75 of the transformer 65 while the input power was held at a constant one volt level by the shunt regulator 45 so that, at full load conditions, the switching elements efficiently delivered 16 amperes to the transformer throughout the life of the generator. The static switching elements were germanium since present silicon-controlled rectifiers could not be used at only 1 volt and tunnel diodes could not be used at 16 amperes.

These transistors 59 and 61 were operated as a switch by applying a square wave on their base emitter junction at a preselected frequency of 200 cps, thereby alternately forward and reverse biasing the junction. When the junction was forward biased, the collector emitter terminals of the transistors were short circuited and when reverse biased, the collector emitter terminals were open circuit. To approach this end closely, the applied square wave had enough power to saturate the transistors at the forward bias condition and as the power applied to the base emitter junction was increased, the resistive collector-to-emitter path of the transistors decreased. Since this was a non-linear relationship, however, the optimum base drive power was determined for several transistors and the transistors selected were empirically tested to determine the optimum base drive.

The transformer 65 had HY MU 80 brand 0.006 inch thick laminations providing a window area about 4 times the core area. This material consists of approximately 79 percent Ni, 17 percent Fe and 4 percent Mo. A ½ inch stack of standard UI-BJ provided this advantageous configuration and weighed only between 4 and 5 pounds. The low frequency limit was determined by core saturation. The core saturation was dependent on the number of primary turns on the transformer and, therefore, also affected copper losses and exciting current losses. The optimum power losses occurred with seven turns on the primary at an operating frequency of 200 cps.

The described two-stage converter started efficiently without excessive power loss. The first state was a one transformer, saturable core multivibrator delivering 0.5 watt base drive to the second stage with a loss of less than 0.3 watt. To this end the transformer 65 utilized a high quality rectangular hysteresis loop core. Starting was accomplished through the connection of the base leads of transistors 59 and 61 to the negative input terminal through current limiting resistor 63. This provided a direct biasing path to the transistors to initiate oscillations at any normal load or environmental condition and was more efficient than conventional methods. Transistors 59 and 61 were connected push-pull and upon starting transistor 59 was conducting and transistor 61 was non-conducting. Therefore $V_T = (V_{IN} - V_{CE(SAT)})$ was across primary 75. This induced a voltage in secondary 79 that kept transistor 61 cut-off. Control occurred due to saturation of transformer 65. As the exciting current increased, the magnetic flux in transformer 65 increased in accordance with the relation $V = N\, d\phi/dt = N\, (d\phi/di)\, (di/dt)$, where $\phi$ were flux linkages. When $i\phi$ reached the saturation point, the rate of growth of flux linkages $d\phi/dt$ tried to remain the same. However, $d\phi/di$ fell toward zero and $di/dt$ increased rapidly to a value greater than could be supplied by the transistor. When the transistor limit was reached, $d\phi/dt$ decreased thereby reducing the induced voltage in secondary winding 79, which was holding transistor 59 on. This reduced $i_c$ and, therefore, $i$ . The negative slope of the $\phi$ versus $c^c$ characteristic induced an opposite voltage in secondary winding 79 that drove transistor 59 off hard, and a voltage in winding 80 that drove transistor 61 on. The transformer flux changed from saturation to negative saturation every half-cycle, by the relation:

$$E_T = 2N_1\, \phi\, \text{max}/T/2 \times 10^{-8}$$

or $$B_{max} = V_{IN} - V_{CE(SAT)}/4NFA \times 10^8$$

where
$A$ = core area, $B_{max}$ = maximum flux density, $E$ = peak voltage of square wave on primary, $F$ = frequency = $1/T$, $N$ = number of turns on primary $\phi$ = BA, $V_{TN}$ voltage in transformer primary, $V_{CE(SAT)}$ = collector-emitter voltage at saturation, $t$ = time and $T$ = period. The output secondaries 98 and 98', produced a square wave with a peak-to-peak output of $2\, (V_{IN} - V_{CE(SAT)})$ multiplied by the turns ratio between the primary and the output secondary. Neglecting switch time, transistors 99 and 101 were always either saturated or off, thereby providing efficient operation.

In obtaining the dc output voltage from the generated square wave, the rectifier section 49 connected to the secondary of the power transformer 41 comprised a center tapped full wave rectifier that balanced the transformer secondary halves 104 and 104'. This system was more efficient than a bridge since it required only two rectifier elements 105 and 107.

The d-c bias voltages for the shunt regulator (±6, +2, and −3 volts) were obtained from the secondary windings on the power transformer 41, as described above. The full wave rectifier and filter circuits utilized silicon diodes as the rectifying elements since, at end-of-life, only a small amount of current flowed in the windings and losses in the rectifiers was very small.

At the 17 watt end-of-life condition, the output voltage was 28.58 volts at 65 ohms load with an 0.05 volt, 400 cps ripple. These values gave an efficiency of 74 percent as shown by the following:

TABLE I

Converter Test Data at 25°c

| Input | | | Output | | | |
|---|---|---|---|---|---|---|
| Voltage | Current (Amperes) | Power (watts) | Voltage | Load (ohms) | Power (watts) | Efficiency (percent) |
| 0.986 | 17.20 | 17.0 | 28.63 | 66 | 12.4 | 73 |
| 1.000 | 25.80 | 25.8 | 28.24 | 66 | 12.1 | |
| 1.005 | 38.25 | 38.3 | 28.66 | 66 | 12.4 | |
| 0.984 | 17.30 | 17.0 | 28.58 | 65 | 12.6 | 74 |
| 0.978 | 25.80 | 26.2 | 28.15 | 65 | 12.2 | |
| 1.005 | 38.25 | 38.3 | 28.33 | 65 | 12.4 | |
| 0.850 | 20.00 | 17.0 | 39.77 | ∞ | 0 | |
| 0.970 | 40.50 | 39.0 | 34.09 | ∞ | 1 | |

Full load conditions for the converter occurred at a load of 65 ohms, which corresponded to the maximum power transfer, and the input voltage did not exceed 1.005 volts for a full to no-load variation at room temperature and did not exceed 1.05 volts for any specified input power from 38-17 watts, load at 28.0± volts or environmental condition from 0-50° C. The following are actual test data over the 0° to 50° C temperature range:

TABLE II

0°C

| | Input | | | Output | |
|---|---|---|---|---|---|
| Voltage | Current (amperes) | Power (watts) | Voltage | Load (ohms) | Power (watts) |
| 1.020 | 16.68 | 17.0 | 28.88 | 66 | 12.6 |
| 1.044 | 36.40 | 38.0 | 28.90 | 66 | 12.7 |
| 1.018 | 16.70 | 17.0 | 28.82 | 65 | 12.8 |
| 1.038 | 36.60 | 38.0 | 28.60 | 65 | 12.6 |
| 1.010 | 37.60 | 38.0 | 34.50 | ∞ | 0 |

50°C

| | | | | | |
|---|---|---|---|---|---|
| 0.952 | 17.80 | 17.0 | 28.38 | 66 | 12.2 |
| 0.986 | 38.60 | 38.0 | 28.42 | 66 | 12.3 |
| 0.950 | 17.80 | 17.0 | 28.34 | 65 | 12.4 |
| 0.988 | 36.60 | 38.0 | 28.16 | 65 | 12.2 |
| 0.930 | 41.00 | 38.0 | 33.60 | ∞ | 0 |

This converter started when the input terminals were connected to the generator leads (no switches being required) at any load, input or environmental condition. The converter could be momentarily shorted with out damaging the system and with fast recovery to normal operation. Moreover, the converter and regulator were contained in a hermetically sealed aluminum can with a total weight of less than 8 pounds.

The power conditioner of this invention makes feasible the utilization of radioisotope heated thermionic generators as a practical power source for a variety of desirable applications. In this regard the power conditioner of this invention is highly efficient, light in weight, small in size, self-starting and trouble-free so that it is particularly suitable for space communication systems. This invention also has the advantage of providing Peltier cooling to protect a DC-DC converter in a practical radioisotope heated thermionic power system even if it is subject to load changes Moreover, in an actual embodiment of this invention of 1.0 VDC source provided 21 amps to a constant full load, while shunting 17 amps at the beginning of the operating lifetime of a decaying source and shunting no amps at the end of the operating lifetime of the decaying source. In an actual embodiment of this invention the input and load levels were maintained within 1 percent of the desired level during their design operating lifetime at an efficiency of better than 70 percent wherein shunting and control were provided at the dc-dc converter input, the source, converter, shunt, regulater and shunt regulator control were parallel connected, and the biasing of the shunt regulator was provided from the step-up transformer in the series connected circuit, comprising the source, converter, step-up transformer and load.

What is claimed is:

1. A power conditioner for a radioisotope powered thermionic generator, comprising a parallel circuit of first generator output means, second DC-DC converter means, shunt regulator means, and control means for producing a decreasing control signal corresponding to the radionuclide decay of said radioisotope, said converter including a first series circuit having a step-up transformer means and an output load means and a second series circuit through said step-up means to said shunt regulator means to provide bias power for said shunt regulator means in response to said control signal for shunting power from said generator output means on the input side of said converter from a high to zero level from the beginning to the end of said generator operating lifetime whereby said control and shunting means efficiently control the converter input and output during the generator operating lifetime and consume zero power at the end of said generator operating lifetime.

2. The invention of claim 1 in which said control means has a threshold transistor and reference signal source in said parallel circuit acting as a differential amplifier for comparing said converter input voltage with a reference signal derived from said converter input to produce a decreasing control voltage corresponding to a decreasing power shunting from said converter input that is required to produce a desired converter input for providing constant low and high converter input and output voltages, constant converter output power, and varying converter input power.

3. The invention of claim 1 in which said shunt regulator means is a thermoelectric cooled shunting transistor which consumes decreasing power from said step-up means for providing an increasing variable resistance in response to a decreasing control signal whereby said shunting transistor is protected from overheating from the beginning to the end of said generator operating lifetime.

4. A power conditioner for a radioisotope heated thermionic generator, comprising a parallel circuit having a radioisotope heated thermionic generator, positive low voltage, output means, variable resistive shunting means for providing an increasing resistance in response to a decreasing bias for shunting said output means, and a DC-DC converter, comprising first and second switching transistors having bases, collectors and emitters connected to each other and said output means, a transformer having a first center tapped primary winding and a first center tapped secondary winding forming opposite ends connecting said bases to each other, to said center taps, and a resistor connecting said center tap of said first secondary winding to a source of potential that is negative relative to said positive output means, said first primary winding also having opposite ends connecting said collectors to each other, a second secondary winding on said transformer having a center tap connected to said positive output means, two oscillator transistors having interconnected emitters connected also to said center tap of said second secondary winding and collectors having a second primary winding connected thereto at its opposite ends, said second primary winding having a core and third and fourth secondary windings forming a second transformer, said third secondary windings for providing high voltage to a load and said fourth secondary windings and having means for biasing said shunting means to shunt said output means for maintaining a constant output from said third secondary winding, the radionuclide decay of said radioisotope producing decreasing output and a correspondingly decreased fourth secondary winding output for biasing said shunting means until said shunt of said output by said shunting means is zero.

5. A power conditioner for a radioisotope heated thermionic generator, comprising a parallel circuit having a radioiosotope heated, thermionic generator, positive, low voltage, output means, a DC-DC converter means for converting said low voltage to high voltage for a load, threshold resistor means for providing a differential amplifier output for comparing a sample voltage with a reference, and thermoelectric cooled shunting transistor means acting as a variable resistor in response to the differential amplifier output for maintaining a constant generator output voltage while decreasing the available power therefrom and protecting said converter from load changes while shunting current from said output means for maintaining the desired converter output for said load during the radionuclide decay of said radioisotope.

6. A power conditioner for a radioisotope heated thermionic generator, comprising a series circuit having a radioisotope heated, thermionic generator, low voltage, positive, first output means, a DC-DC converter rectifier, filter means, and a load, said converter having a self-starting first power switching means and an oscillator in parallel with said output means for providing pulsating DC for said rectifier filter and said load, and a shunt regulator in parallel with said output means for shunting current from said output selectively to decrease the output from said transformer, said regulator having a threshold means and reference voltage means in parallel with said output means for supplying a differential output corresponding to the difference between said output means and the desired output means voltage, and transistors in series with Peltier cooled thermocouples for shunting said current in response to said differential output whereby said output from said transformer is constant despite the decay of said radioisotope.

7. In an electrical power conditioner apparatus for supplying to a load a high constant output voltage and power at high efficiency from a constant, direct current, low voltage, radioisotope heated, thermionic generator, input source having an input power decay generator, comprising a series circuit having a dc-dc convertor for converting said low voltage direct current to pulsating direct current, a step up transformer, and a rectifier for supplying pulsating high voltage, the improvement, comprising parallel means connected to said input source for producing a low reference threshold voltage corresponding to the desired constant low voltage and comparing it with the input source voltage to produce a difference voltage and said desired constant voltage, means for converting said difference voltage to a proportional current, and Peltier cooled transistor for shunting means responsive to said proportional current for providing a variable resistance for shunting said input power in direct proportion to said radionuclide decay of said generator to maintain said desired constant low voltage input and high constant output voltage and power, at high efficiency.

* * * * *